United States Patent
Wang et al.

[11] Patent Number: 6,058,428
[45] Date of Patent: May 2, 2000

[54] METHOD AND APPARATUS FOR TRANSFERRING DIGITAL IMAGES ON A NETWORK

[75] Inventors: Wu Wang, Los Altos; Chan Chiu, Sunnyvale; Steve Morris, Palo Alto; Prasad Kongara, San Jose, all of Calif.

[73] Assignee: Pictra, Inc., Sunnyvale, Calif.

[21] Appl. No.: 08/985,578

[22] Filed: Dec. 5, 1997

[51] Int. Cl.[7] .................................................. G06F 15/16
[52] U.S. Cl. ........................ 709/232; 709/217; 709/218; 709/225; 709/231; 709/237; 707/200; 707/2; 707/10; 707/204; 707/202; 707/203
[58] Field of Search ................................. 707/200, 2, 10, 707/204, 202, 203; 709/217, 218, 225, 231, 237, 232

[56] References Cited

U.S. PATENT DOCUMENTS

| | | | |
|---|---|---|---|
| 5,206,915 | 4/1993 | Kern et al. ................................... | 382/7 |
| 5,442,749 | 8/1995 | Northcutt et al. .................. | 395/200.09 |
| 5,558,148 | 9/1996 | Landis et al. ........................... | 395/601 |
| 5,771,355 | 12/1995 | Kuzma ................................ | 395/200.62 |
| 5,790,789 | 8/1998 | Suarez .................................. | 395/200.32 |
| 5,793,966 | 12/1998 | Amstein et al. .................... | 395/200.33 |
| 5,799,322 | 8/1998 | Mosher, Jr. .............................. | 707/202 |
| 5,812,989 | 9/1998 | Witt et al. .................................. | 705/40 |
| 5,860,068 | 12/1997 | Cook ........................................ | 705/26 |
| 5,926,623 | 1/1997 | Tsukakoshi et al. ................. | 395/200.3 |

*Primary Examiner*—Le Hien Luu
*Assistant Examiner*—Stephen Willett
*Attorney, Agent, or Firm*—Blakely, Sokoloff, Taylor & Zafman

[57] ABSTRACT

A method and apparatus transfer digital images on a network. A signature list is first examined wherein the signature list includes a unique signature for each of the digital images requested for transfer. The signature list is used to determine whether each of the digital images is present or missing. For each of the digital images that is determined missing, the digital image is then received. Updated information is also received pertaining to the each of the digital images that is determined present. Data integrity is checked to ensure that the each of the digital images was successfully transferred. Finally, the steps of receiving the digital images and checking data integrity are repeated for the each of the digital images that was unsuccessfully transferred.

12 Claims, 7 Drawing Sheets

METHOD AND APPARATUS FOR TRANSFERRING DIGITAL IMAGES ON A NETWORK

FIELD OF THE INVENTION

The present invention relates to a method and apparatus for transferring digital images on a network.

DESCRIPTION OF RELATED ART

Various digital acquisition devices, such as digital cameras or scanners, may be used to capture and manipulate images. For example, a digital acquisition device may capture an image of a person. The image may then be input into a computer system that is executing a digital photography software program, such as Photoshop™ from Adobe Systems, Inc. of San Jose, Calif. Once the digital image is input into the computer system, the image is stored on a computer readable storage medium, such as a hard disk, a floppy disk, an optical disk, or other well known computer readable storage media. The storage of the media on the computer readable storage media is controlled by a file management system which is usually considered to be a disk operating software system which is also running on the computer system. Thus the results of the conventional digital photography software is the storage of a file which contains the content of the digital picture on a computer readable medium which is controlled by the file management system of the computer system. The user can then modify the image, print the image or perform other operations with the image.

One operation that may be performed on an image is the distribution or publication of the image over a network, such as the World Wide Web ("the Web") or the Internet. The Web represents all of the computers on the Internet that offer users access to information on the Internet via interactive documents or Web pages. An image may thus be distributed on the Web as a Web page. In general, Web pages contain hypertext links that are used to connect any combination of graphics (including digital images), audio, video and text, in a non-linear, non-sequential manner. Hypertext links are created using a special software language known as HyperText Mark-Up Language (HTML).

Once created, Web pages reside on the Web, on Web servers or Web sites. A Web site can contain numerous Web pages. Web client machines running Web browsers can access these Web pages at Web sites via a communications protocol known as HyperText Transport Protocol (HTTP). Web browsers are software interfaces that run on Web clients to allow access to Web sites via a simple user interface. A Web browser allows a Web client to request a particular Web page from a Web site by specifying a Uniform Resource Locator (URL). A URL is a Web address that identifies the Web page and its location on the Web. When the appropriate Web site receives the URL, the Web page corresponding to the requested URL is located, and if required, HTML output is generated. The HTML output is then sent via HTTP to the client for formatting on the client's screen.

Figure 1:
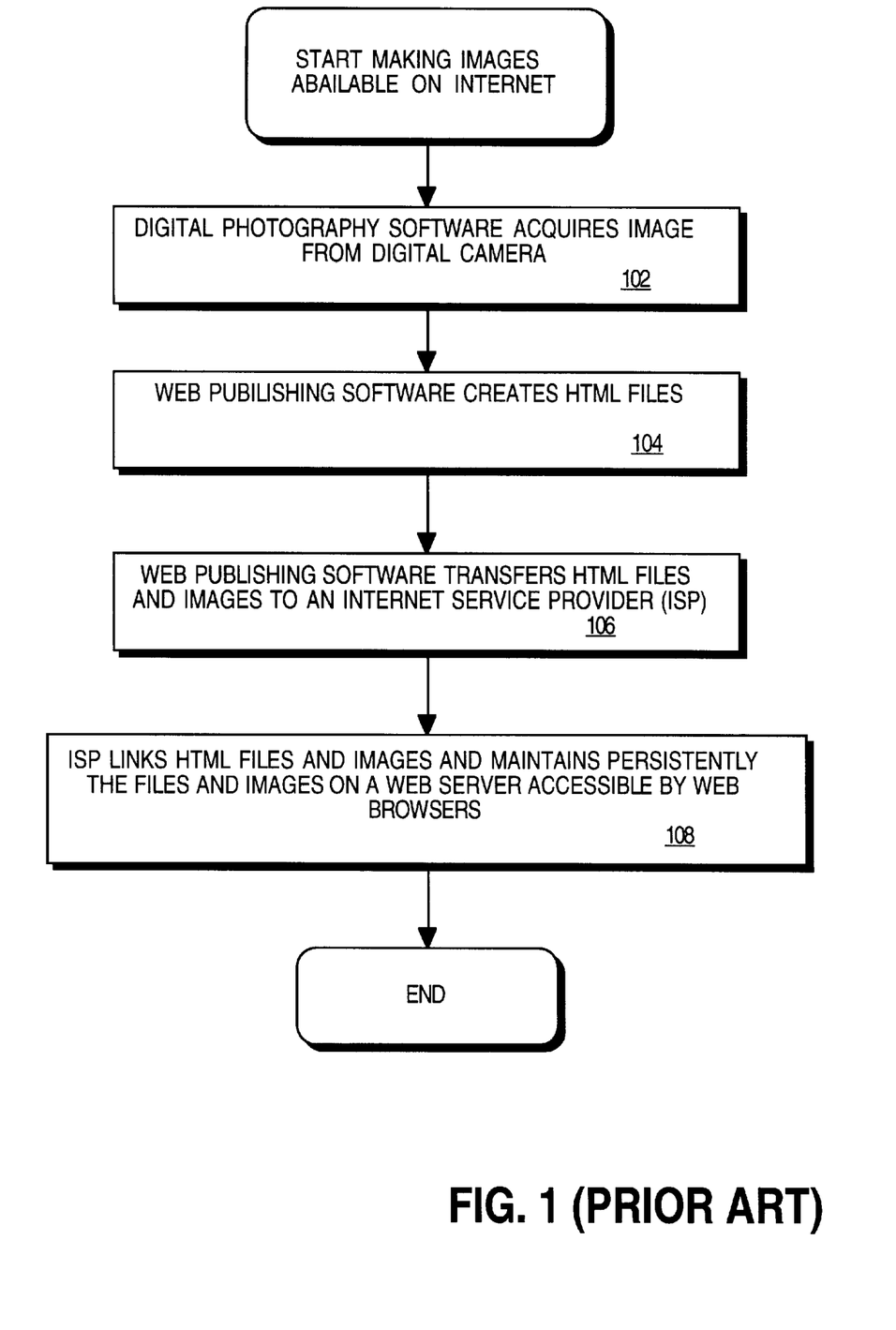
FIG. 1 shows the various steps required in a prior art system in order to make digital images available for viewing over the Internet to Web browsers

FIG. 1 shows the various steps required in a prior art system in order to make digital images available for viewing over the Internet to Web browsers. The method starts by the acquisition of an image from a digital camera in step 102, typically by a digital photography program such as Photoshop. The digital photography program receives the input from the digital camera and causes to the inputted image to be saved in the file management system of the computer system.

In step 104, a separate computer program, such as a Web publishing software program creates HTML files specifying Web documents. As described above, these HTML files may have insertion points for various digital images such as those acquired from a digital camera in step 10. Then, in step 106, Web publishing software such as Microsoft's Frontpage '97™, transfers the HTML file and the digital images stored in step 102 to an Internet Service Provider (ISP). The HTML files and digital images are generally transferred separately. In step 108, the ISP links the HTML files and the appropriate images and maintains persistently the HTML pages from the files and the images on a Web server. This allows Web browsers to view the HTML pages from the Web server provided by the ISP.

The foregoing procedure is relatively complicated, requiring the user of the digital camera to have some familiarity with HTML document creation, and also requiring the use of at least two separate programs on the computer system which receives the input from the digital camera. Furthermore, the ISP must perform the linking operation in order to maintain HTML pages which presents the images to Web browsers over the Internet. The user is thus dependent on the ISP to properly publish his or her digital images.

While it is possible to use e-mail computer programs or public bulletin board services to attempt to distribute digital media over a network, such programs or systems are not designed to provide for the generation of a collection of digital media, the transmission of the collection or the automatic generation from the collection of viewable media. Given the complexity of the foregoing tasks, it is desirable to allow a user of a digital camera to easily distribute or publish images from the digital camera or other digital acquisition devices over a network such as the Internet.

SUMMARY OF THE INVENTION

The present invention discloses a method and apparatus for transferring digital images on a network. A signature list is first examined wherein the signature list includes a unique signature for each of the digital images requested for transfer. The signature list is used to determine whether each of the digital images is present. For each of the digital images that is determined missing, the digital image is then received. Updated information is also received pertaining to the each of the digital images that is determined present. Data integrity is checked to ensure that the each of the digital images was successfully transferred. Finally, the steps of receiving the digital images and checking data integrity are repeated for the each of the digital images that was unsuccessfully transferred.

Other objects, features and advantages of the present invention will be apparent from the accompanying drawings and from the detailed description.

BRIEF DESCRIPTION OF THE DRAWINGS

The present invention is illustrated by way of example and not by way of limitation in the figures of the accompanying drawings in which like reference numerals refer to similar elements and in which.

DETAILED DESCRIPTION OF THE PREFERRED EMBODIMENT

The present invention relates to a method and apparatus for transferring digital images on a network. In the following detailed description, numerous specific details are set forth in order to provide a thorough understanding of the present invention. It will be apparent to one of ordinary skill in the art that these specific details need not be used to practice the present invention. In other instances, well-known structures, interfaces, and processes have not been shown in detail in order not to unnecessarily obscure the present invention.

Figure 2:
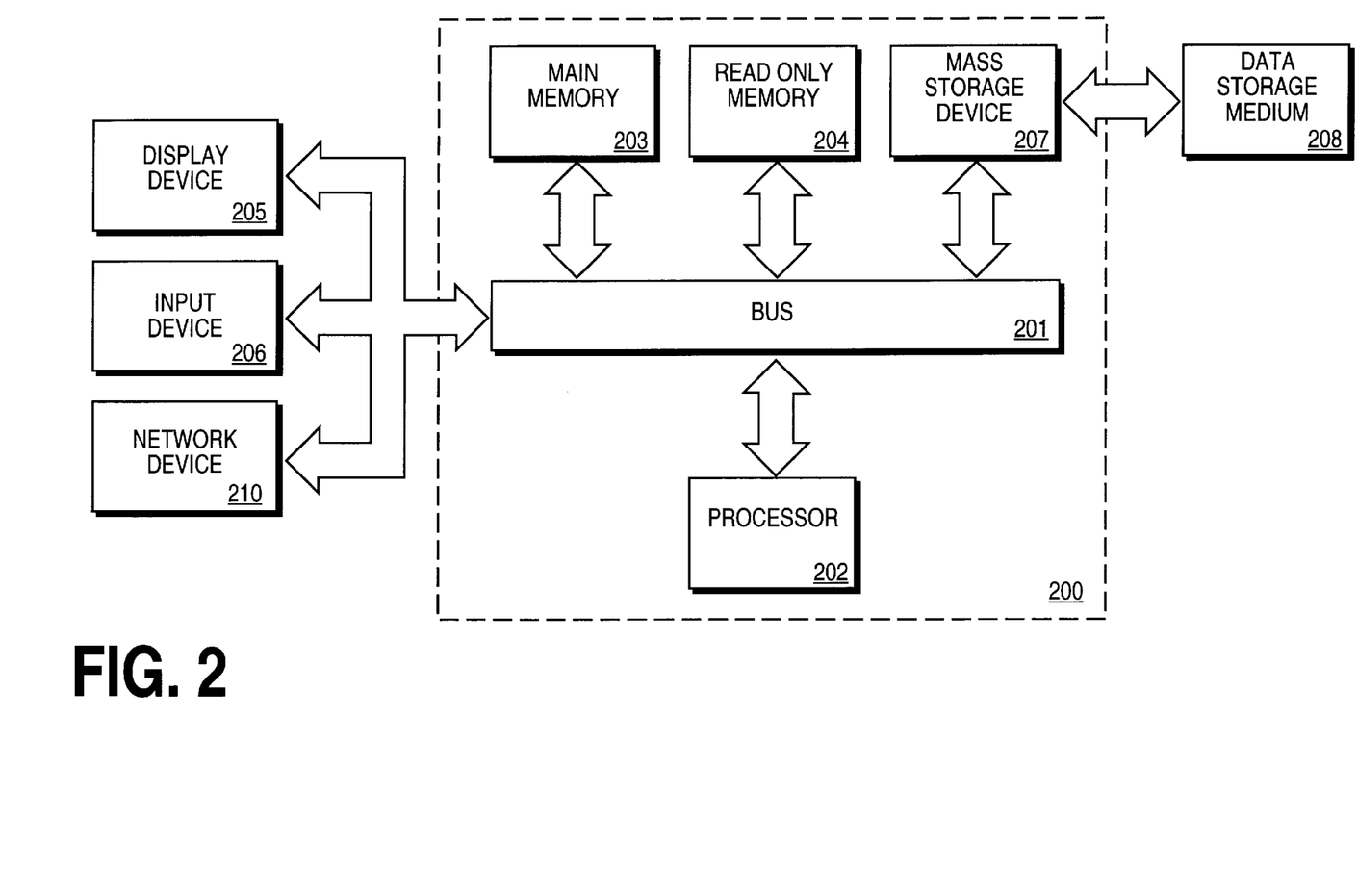
FIG. 2 illustrates a typical computer system 200 in which the present invention operates

FIG. 2 illustrates a typical computer system 200 in which the present invention operates. One embodiment of the present invention is implemented on a personal computer architecture. It will be apparent to those of ordinary skill in the art that other alternative computer system architectures may also be employed.

In general, such computer systems as illustrated by FIG. 2 comprise a bus 201 for communicating information, a processor 202 coupled with the bus 201 for processing information, main memory 203 coupled with the bus 201 for storing information and instructions for the processor 202, a read-only memory 204 coupled with the bus 201 for storing static information and instructions for the processor 202, a display device 205 coupled with the bus 201 for displaying information for a computer user, an input device 206 coupled with the bus 201 for communicating information and command selections to the processor 202, and a mass storage device 207, such as a magnetic disk and associated disk drive, coupled with the bus 201 for storing information and instructions. A data storage medium 208 containing digital information is configured to operate with mass storage device 207 to allow processor 202 access to the digital information on data storage medium 208 via bus 201.

Processor 202 may be any of a wide variety of general purpose processors or microprocessors such as the Pentium® processor manufactured by Intel® Corporation. It will be apparent to those of ordinary skill in the art, however, that other varieties of processors may also be used in a particular computer system. Display device 205 may be a liquid crystal device, cathode ray tube (CRT), or other suitable display device. Mass storage device 207 may be a conventional hard disk drive, floppy disk drive, CD-ROM drive, or other magnetic or optical data storage device for reading and writing information stored on a hard disk, a floppy disk, a CD-ROM a magnetic tape, or other magnetic or optical data storage medium. Data storage medium 208 may be a hard disk, a floppy disk, a CD-ROM, a magnetic tape, or other magnetic or optical data storage medium.

In general, processor 202 retrieves processing instructions and data from a data storage medium 208 using mass storage device 207 and downloads this information into random access memory 203 for execution. Processor 202, then executes an instruction stream from random access memory 203 or read-only memory 204. Command selections and information input at input device 206 are used to direct the flow of instructions executed by processor 202. Equivalent input device 206 may also be a pointing device such as a conventional mouse or trackball device. The results of this processing execution are then displayed on display device 205.

Computer system 200 includes a network device 210 for connecting computer system 200 to a network. Network device 210 for connecting computer system 200 to the network includes Ethernet devices, phone jacks and satellite links. It will be apparent to one of ordinary skill in the art that other network devices may also be utilized.

According to one embodiment of the present invention, the user of a computer system may create a picture album or other type of "media container" using a media authoring program such as Pictra Album™. The following paragraphs describe an overview of the authoring process via the media authoring program, followed by a detailed description of the protocols used to implement this media authoring program. It will be appreciated that although the following description assumes that the media authoring program is Pictra Album, used to create albums and publish the albums on the Internet, other similar media authoring programs may also be utilized according to alternate embodiments of the present invention.

OVERVIEW OF MEDIA AUTHORING

According to one embodiment, a user inputs digital images from a digital acquisition device such as a digital camera into a digital processing system. The user makes selections in a file-saving dialogue box presented to the user on a display of the computer system in order to store the original images to the file storage device, such as a hard disk. The storage occurs under the control of a file management system such as a disk operating system. The image storage typically has a unique name on the file storage device or at least a unique full pass name for this type of image file.

A data object is then created for each digital image and stored in a database. This storage is in addition to the storage of the original file for the original image on a file storage device. The storage in the database typically is performed by a picture management system which is typically a separate piece of software which creates and stores the data object for each digital image and which also maintains the database. In particular, a lower resolution version of a digital image, such as a "thumbnail" version is stored in the database along with a link to the original image stored in the file storage device under the control of the file management system. The link which is stored in association with the thumbnail version refers back to the original image by identifying the picture title or caption as well as the full pass name of the original image stored on the file storage device.

The user of the computer system may then create a picture album or another type of media container using the media authoring program. According to one embodiment a picture album has multiple pages with multiple pictures on a page. It will be appreciated that the term digital media includes digital images, such as digital pictures imported or acquired from a digital camera as well as audio files and video files (e.g. Quicktime files) and other digital documents such as word processing files. Thus, a digital picture is a form of a digital media. Similarly, media container is a general term which includes a picture album. A media container may also include and contain other types of media including audio files, video files or software files such as word processing document files.

Once a user has published images or an album onto a server on the Internet, various third parties may then view the images or albums from a Web browser. The user of the client computer system can cause a media container with its associated digital media to be published to the Internet for others to view with conventional Web browsers, such as Netscape's Navigator or Microsoft's Internet Explorer. Although the interaction described herein between the client computer system and the server system is via a Web server, it will be appreciated that the client system may communicate directly with the server system in an alternative embodiment, or may communicate with only the Web server according to yet another embodiment.

Figure 3:
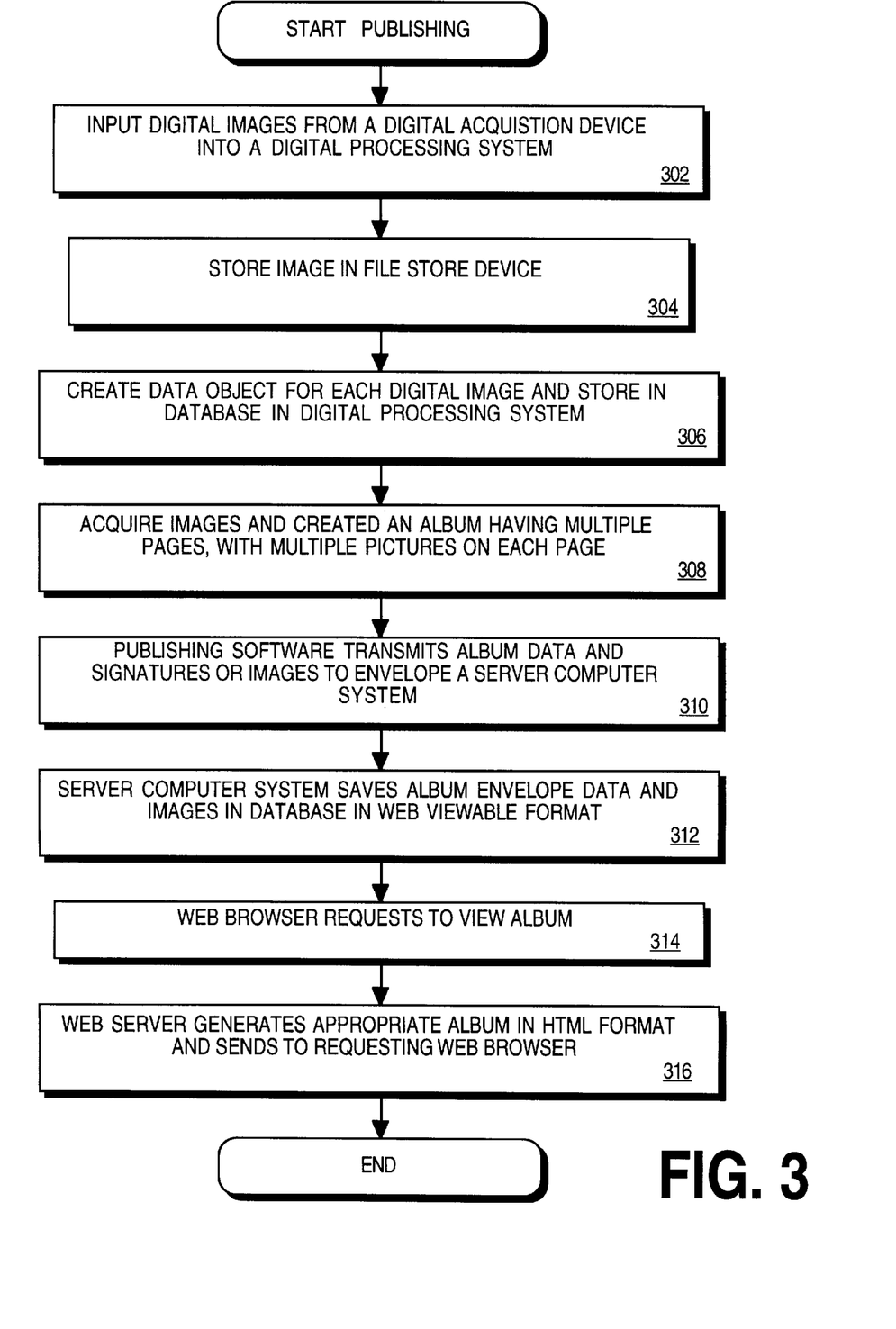
FIG. 3 is a flow diagram illustrating the publishing process

FIG. 3 is a flow diagram illustrating the publishing process. Specifically, in step 302, the digital images are input from a digital acquisition device, (e.g. a digital camera) into a digital processing system. The image is then stored on a file storage device in step 304. The image usually has a unique name on the file storage device for this type of image file. In step 306, a data object is created for each digital image (e.g. a thumbnail version with a link to the original image) and stored to a database in the digital processing system.

In step 308, when a user desires to create a picture album, the user may utilize a media authoring program such as Pictra Album to create or "author" an album. The album may have multiple pages and each page may have multiple pictures. Publishing software then transmits the album envelope data and signatures or images to a server computer system in step 310. In step 312, the server computer system saves album envelope data and images in a database, in a Web viewable format. In step 314, a Web browser requests to view an album from the server computer system, and in step 316, the server computer system generates an appropriate page of an album in HTML format and sends the page to the Web browser which requested the album.

UPLOADING AND DOWNLOADING PROTOCOLS

The following paragraph describes the protocols utilized by the client and the server in order to accomplish uploading images during the publishing phase described above, and downloading images and albums subsequent to the images and albums being published on the Internet. Although the following paragraphs makes reference only to albums, it will be appreciated that a similar methodology is applicable to uploading and downloading individual images.

The process of uploading an image begins when a client connects to a server to publish digital images onto the server. The server determines that the client intends to publish digital images when the server receives an HTTP "POST" command from the client. Traditionally, the POST command has been used to upload ASCII data onto Web servers. According to one embodiment of the present invention, the POST command is used together with the protocols described below to perform uploads of binary and media data, i.e. images, in addition to ASCII data. Additionally, the POST command was traditionally used to transfer only single ASCII files, while according to one embodiment of the present invention, POST is used to upload multiple binary, media and ASCII files according to the protocols described below.

According to one embodiment of the present invention, a version check is first performed, to determine compatibility between the client software and the server software. If the client's software does not match the server software, the client is provided with the option of downloading a new version of the client software, or instructed to install the client software at another time prior to attempting to upload the images.

If the client's software is determined to be compatible with the server software, then the client is allowed to proceed with the uploading process. More specifically, the user then specifies from the client albums that the user wishes to upload from the client onto the server. The server examines its database to determine whether the albums already exist. If the albums already exist, then the user is queried to determine whether he or she wishes to replace the album. If the album does not exist, or if the user selects the option of replacing an existing album, then "album envelope data" is transmitted from the client to the server. "Album envelope data" specifies characteristics of the album including the title of the album, the number of images in the album, the layout of the album, the background and a "signature list" for the images in the album. A signature list includes a signature for each image in the album. In one embodiment, the signature is a 16–32 byte identification code that uniquely identifies each image.

The server receives the album envelope data and examines the signature list to determine which images are "matched" and which ones are "not matched." A "match" is indicative of an identical image on the server, while a "not matched" indicates that the image does not exist on the server or is out of date. A list of matching signatures is then sent back to the client, and the album envelope data on the server is saved to the database for later reference. The client then sends over entire images for the images that are not on the list of matching signatures, i.e. images that are either not on the server or those that are out of date. For the rest of the images, i.e. the images that are determined to be a match with an image that is already on the server, the client nonetheless sends "transformation" information over to the server. Transformation information includes updated positioning information and other such manipulation information that does not affect the actual stored image, only the image as later displayed to the user. This process continues until all images in the albums have been transmitted from the client to the server.

On the server, a signature is regenerated for new images to verify the data integrity between the data sent by the client and the data received by the server. Thus, in order for data integrity to be maintained, the signature of the sent image must match the signature generated by the server when it receives the image. The original signature list saved in the database is used to perform the verification. Next, if an image is new, the original image is saved to the database, and corresponding JPEG HTML images are generated and stored in the database. As described in the overview above, these HTML images may be thumbnails of the original image.

In the event that the signatures of the images that are sent and the regenerated signatures on the server do not match, the client is presented with an error message, and the images are re-sent from the client to the server. The signature verification is then performed again, to confirm data integrity. This protocol for uploading albums from a client to a server efficiently prevents the client from having to upload data that is already on the server.

Figure 4A:
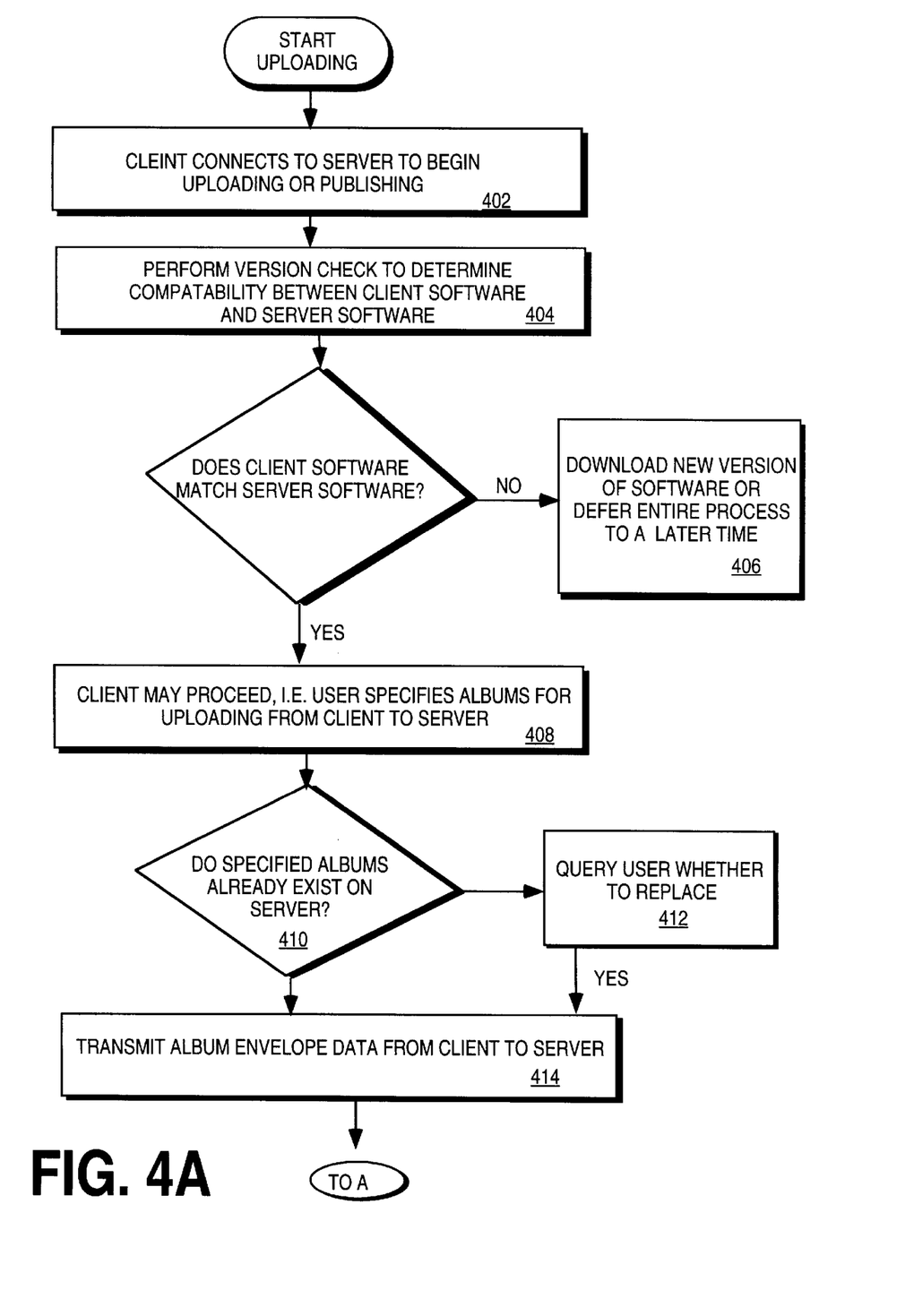
FIG. 4 is a flow diagram illustrating the uploading process
Figure 4B:
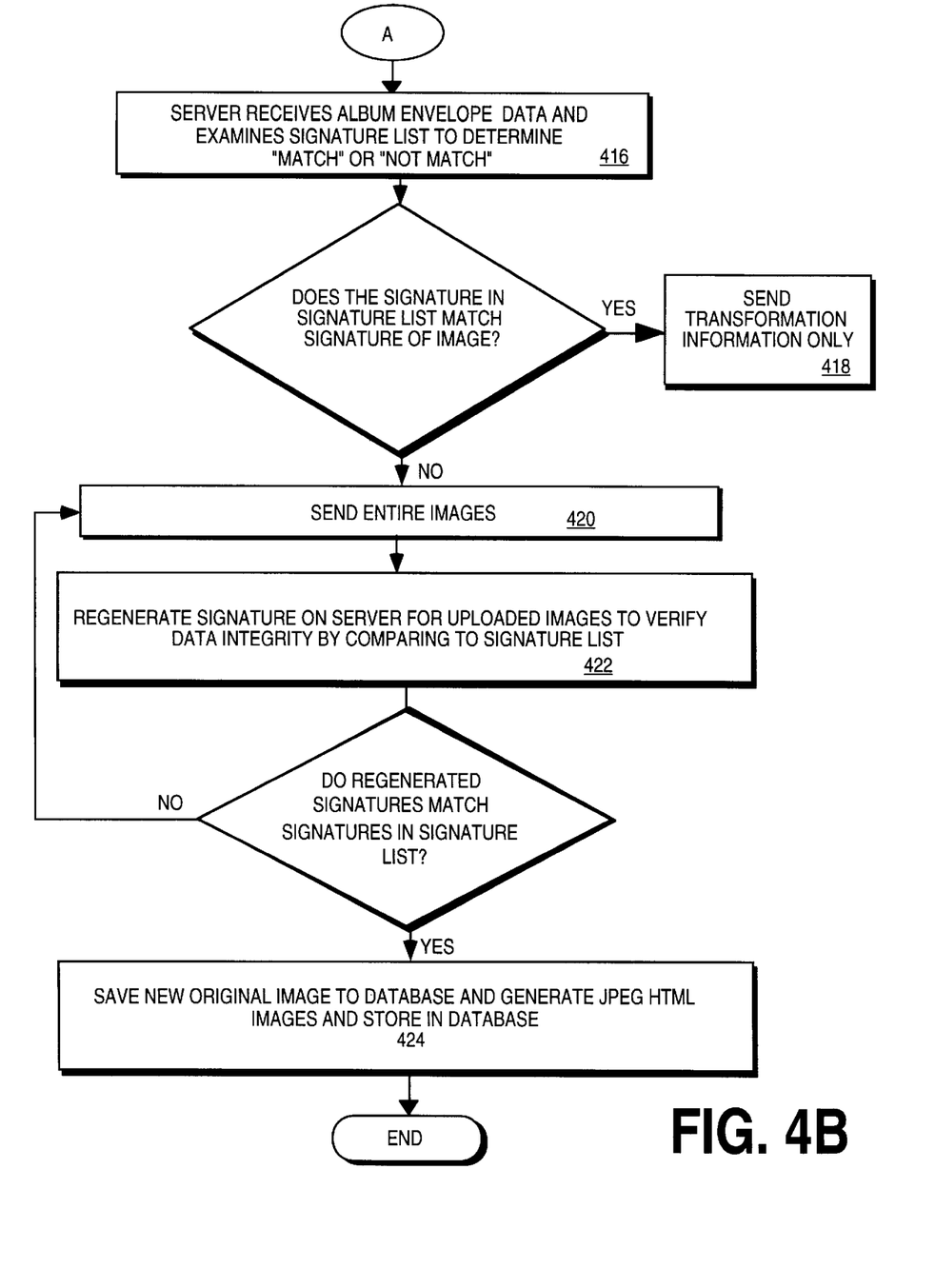

FIG. 4 is a flow diagram illustrating the uploading process. Specifically, in step 402, a client connects to a server to begin the process of publishing or uploading digital images onto the server. In step 404, a version check is performed to determine compatibility between the client software and the server software. If the client software does not match the server software, then in step 406 the client is provided with the option of downloading a new version of the software or instructed to install the client software at another time prior to attempting to uploading images.

If the client software is determined to be compatible with the server software, then in step 408, the client is allowed to proceed with the uploading process. More specifically, the user then specifies albums that the user wishes to upload from the client onto the server. In step 410, the server examines its database to determine whether the albums already exist. If the album already exists, then the user is queried whether he or she wishes to replace the album in step 412. If the album does not exist or if the user selects the option of replacing an existing album, then in step 414, album envelope data is transmitted from the client to the server.

In step 416, the server receives the album envelope data and examines the signature list to determine which images are "matched" and which ones are "not matched." If the images are matched on the signature list, in step 418, the client sends over transformation information for the images that are matched. The client also sends over entire images for the images that are not on the list of matching signatures in step 420. In step 422, a signature is regenerated on the server for new images uploaded from the client to verify the data integrity between the data sent by the client and the data received by the server. Data integrity is determined by comparing the regenerated signatures to the signatures in the signature list. If the signatures do not match, then the images are transmitted again and data integrity is checked again. If the signatures match, then new images are saved to the database and corresponding JPEG HTML images are generated and stored in the database in step 424.

Similar protocols are executed when a client desires to download an album. The process of downloading an image begins when a client connects to a server to download digital images from the server. The server determines that the client intends to download digital images when the server receives an HTTP "GET" command from the client.

A version check is performed to determine the compatibility of the client and the server software when the client connects to the server to issue the GET command. Assuming the versions are compatible, the client may then specify an album to be retrieved from the server. The server retrieves the appropriate album from the database, and sends the client the album envelope data for the album, including a signature list.

On the client, the signature list is received from the server and examined to determine which images are not stored locally on the client computer. The client then retrieves from the server images that do not match or that have signatures that do match. The server retrieves the images from the database and sends the images over to the client. If the same album already exists on the client, the downloaded album is simply given a new name. The signatures are regenerated on the client to once again determine data integrity between the data that was sent by the server and the data that was received by the client. In the event that the signatures of the images that are sent and the regenerated signatures on the client do not match, the images are re-sent from the server to the client. The signature verification is then performed again, to confirm data integrity.

Figure 5A:
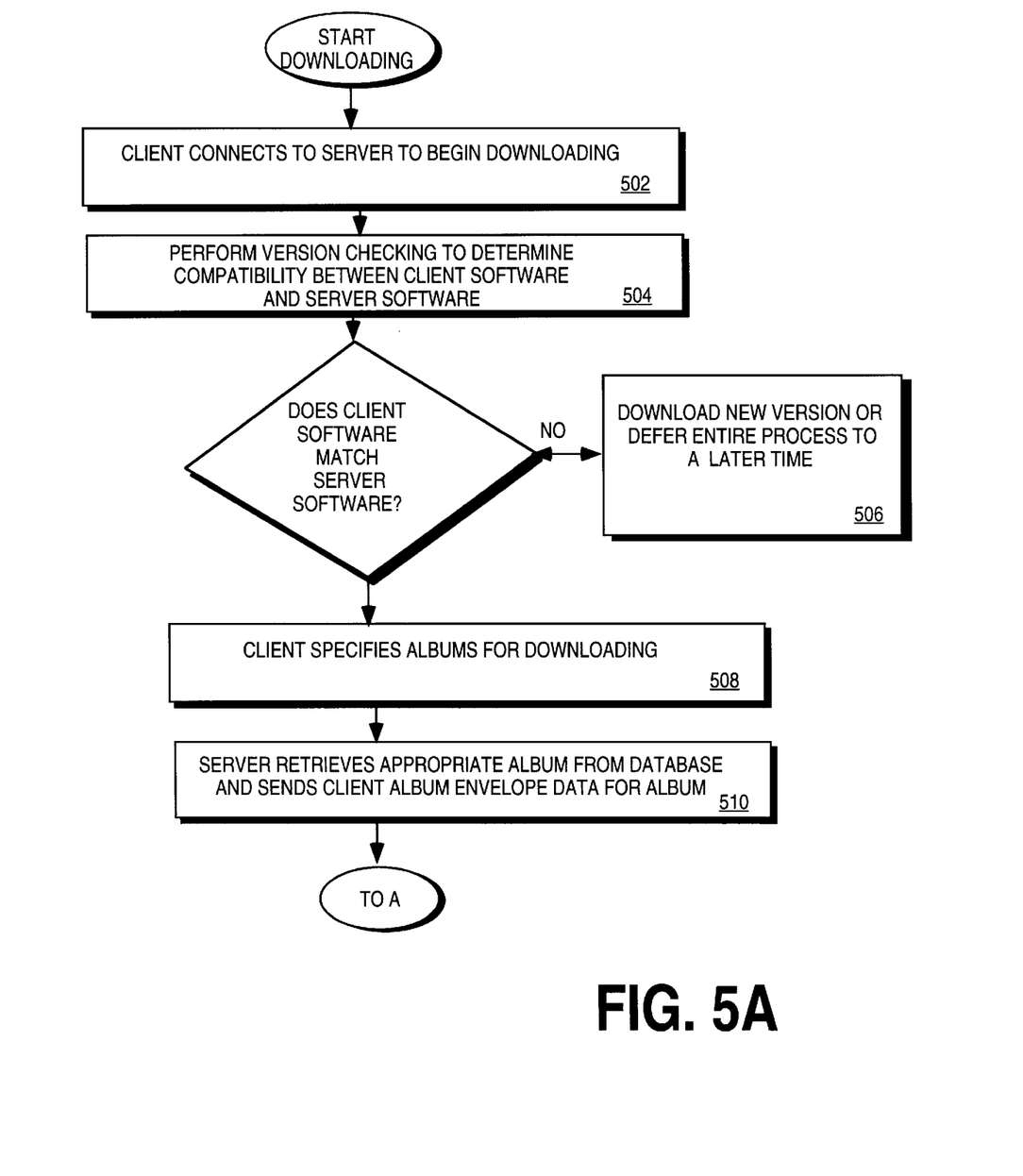
FIG. 5 is a flow diagram illustrating the downloading process
Figure 5B:
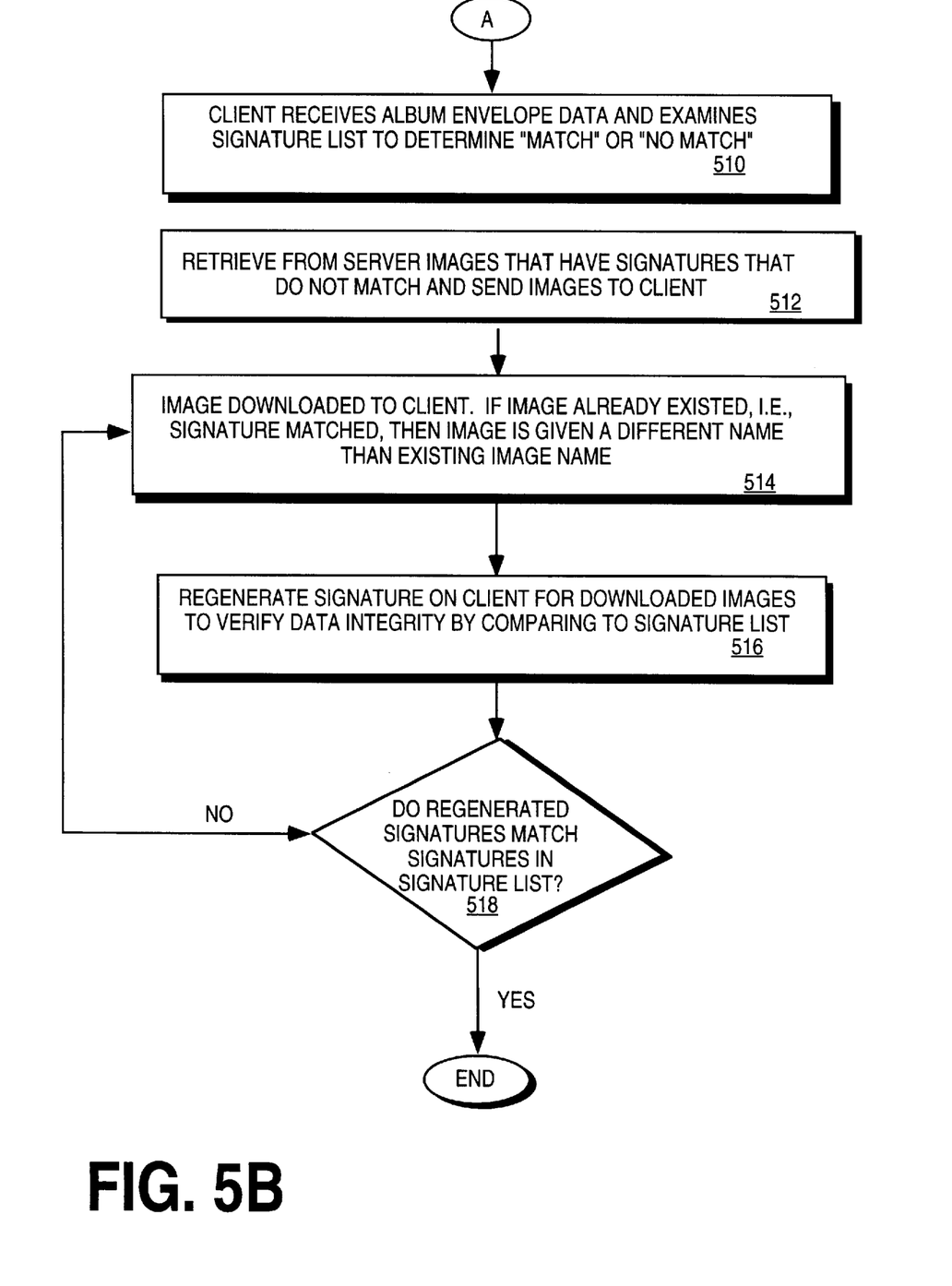

FIG. 5 is a flow diagram illustrating the downloading process. Specifically, in step 502, a client first connects to a server to perform a download of an album from the server to the client. In step 504, a version check is performed to determine the compatibility of the client and the server software. If the client software does not match the server software, then in step 506 the client is provided with the option of downloading a new version of the software or instructed to install the client software at another time prior to attempting to uploading images.

If the versions are compatible, in step 508 the client may specify an album to be retrieved from the server. In step 510, the server retrieves the appropriate album from the database and sends the client the album envelope data for the album. The signature list is received on the client in step 512 and examined to determine which images are not stored locally on the client computer. In step 514, if the same album already exists on the client the downloaded album is simply given a new name. Otherwise, if the same album does not exist, the server simply sends the images over to the client. In step 516, the signatures are regenerated on the client to once again determine data integrity between the data that was sent by the server and the data that was received by the client. Data integrity is determined by comparing the regenerated signatures to the signatures in the signature list in step 518. If the signatures do not match, then the images are transmitted again and data integrity is checked again. Otherwise, the downloading process is complete.

Thus, a method and apparatus for transferring digital images on a network is disclosed. These specific arrangements and methods described herein are merely illustrative of the principles of the present invention. Numerous modifications in form and detail may be made by those of ordinary skill in the art without departing from the scope of the present invention. Although this invention has been shown in relation to a particular preferred embodiment, it should not be considered so limited. Rather, the present invention is limited only by the scope of the appended claims.

What is claimed is:

1. A computer-implemented method for transferring digital images between devices on a network, the computer-implemented method comprising the steps of:

examining a signature list wherein the signature list includes a unique signature for each of the digital images requested for transfer;

determining from the signature list the each of the digital images that are present and the each of the digital images that are missing;

receiving the each of the digital images that are missing and updated information pertaining to the each of the digital images that are present;

checking data integrity to ensure that the each of the digital images was successfully transferred; and repeating for the each of the digital images that was unsuccessfully transferred the steps of receiving the each of the digital images and checking data integrity.

2. The computer-implemented method according to claim 1 further including the step of verifying compatibility of versions of software residing on each of the devices prior to examining the signature list.

3. The computer-implemented method according to claim 1 wherein the step of determining from the signature list the each of the digital images that is present includes the steps of:

examining the signature list;

determining whether the signature for the each of the digital images in the signature list matches the signature for the each of the digital images requested for transfer;

identifying the each of the digital images as present where the signature in the signature list matches the signature for the each of the digital images for transfer; and identifying a remainder of the each of the digital images as missing.

4. A computer-implemented method for uploading digital images from a client to a server on a network, the computer-implemented method comprising the steps of:

receiving a request from the client to transfer the digital images to the server;

receiving a signature list from the client wherein the signature list includes a unique signature for each of the digital images requested for transfer;

examining the signature list on the server to determine whether the each of the digital images is present on the server;

informing the client of the each of the digital images that is missing;

receiving from the client the each of the digital images that is missing and updated information pertaining to the each of the digital images that is present;

regenerating a signature of the each of the digital images received from the client;

comparing the regenerated signature to the signature in the signature of each of the digital images on the signature list to determine that the each of the images was transferred successfully from the client;

repeating for the each of the digital images that was unsuccessfully transferred the steps of receiving from the client the each of the digital images and comparing the regenerated signature; and saving the signature list, the each of the digital images, the updated information and a miniaturized copy of the each of the digital images in a database on the server.

5. The computer-implemented method according to claim 4 further including the step of verifying compatibility of versions of software residing on the client and the server prior to examining the signature list.

6. The computer-implemented method according to claim 4 wherein the step of examining the signature list on the server to determine whether the each of the digital images is present on the server includes the steps of:

determining whether the signature for the each of the digital images in the signature list matches the signature for the each of the digital images requested for transfer;

identifying the each of the digital images as present where the signature in the signature list matches the signature for the each of the digital images for transfer; and identifying a remainder of the each of the digital images as missing.

7. A computer-implemented method for downloading digital images from a server to a client on a network, the computer-implemented method comprising the steps of:

receiving a request to download the digital images from the server to the client;

sending a signature list to the client wherein the signature list includes a unique signature for each of the digital images requested for transfer;

examining the signature list on the client to determine whether the each of the digital images is present on the client;

informing the server of the each of the digital images that is missing;

receiving from the server the each of the digital images that is missing on the client and updated information pertaining to the each of the digital images that is present on the client;

regenerating a signature of the each of the digital images received from the server;

comparing the regenerated signature to the signature of the each of the digital images in the signature list to determine that the each of the images was transferred successfully; and repeating for the each of the digital images that was unsuccessfully transferred the steps of receiving from the server the each of the digital images and comparing the regenerated signature.

8. The computer-implemented method according to claim 7 further including the step of verifying compatibility of versions of software residing on each the client and the server prior to examining the signature list.

9. The computer-implemented method according to claim 7 wherein the step of examining the signature list on the client to determine whether the each of the digital images is present on the client includes the steps of:

determining whether the signature for the each of the digital images in the signature list matches the signature for the each of the digital images requested for transfer;

identifying the each of the digital images as present where the signature in the signature list matches the signature for the each of the digital images for transfer; and identifying a remainder of the each of the digital images as missing.

10. A system for transferring digital images between devices on a network, the system comprising:

a first device, the first device examining a signature list wherein the signature list includes a unique signature for each of the digital images requested for transfer;

the first device determining from the signature list the each of the digital images that are present and the each of the digital images that are missing;

a second device coupled to the first device via a network, the second device transmitting to the first device via the network the each of the digital images that are missing on the first device and updated information pertaining to the each of the digital images that are present on the first device; and the first device checking data integrity to ensure that the each of the digital images was successfully transferred from the second device, the second device retransmitting to the first device the each of the digital images that was unsuccessfully transferred.

11. The system according to claim 10 wherein the first device verifies the compatibility of versions of software residing on the first device and the second device prior to examining the signature list.

12. The system according to claim 10 wherein the first device further determines whether the signature for the each of the digital images in the signature list matches the signature for the each of the digital images requested for transfer, the first device also identifying the each of the digital images as present where the signature in the signature list matches the signature for the each of the digital images for transfer and identifying a remainder of the each of the digital images as missing.

* * * * *